(No Model.)

J. BARRETT.
PIPE COUPLING.

No. 539,112. Patented May 14, 1895.

WITNESSES: INVENTOR:
A. W. Harrison James Barrett
F. P. Davis. by Knight Brown & Quinby
Attys.

UNITED STATES PATENT OFFICE.

JAMES BARRETT, OF BOSTON, MASSACHUSETTS.

PIPE-COUPLING.

SPECIFICATION forming part of Letters Patent No. 539,112, dated May 14, 1895.

Application filed March 2, 1894. Serial No. 502,110. (No model.)

*To all whom it may concern:*

Be it known that I, JAMES BARRETT, of Boston, in the county of Suffolk and State of Massachusetts, have invented certain new and useful Improvements in Pipe-Couplings, of which the following is a specification.

This invention relates to couplings for connecting lead pipe to cast iron or other hard metal pipes or sockets.

It has for its object to provide a coupling device which will securely connect the two parts, and by which the connection may be quickly effected.

The invention consists in the improvements which I will now proceed to describe and claim.

Figure 1:
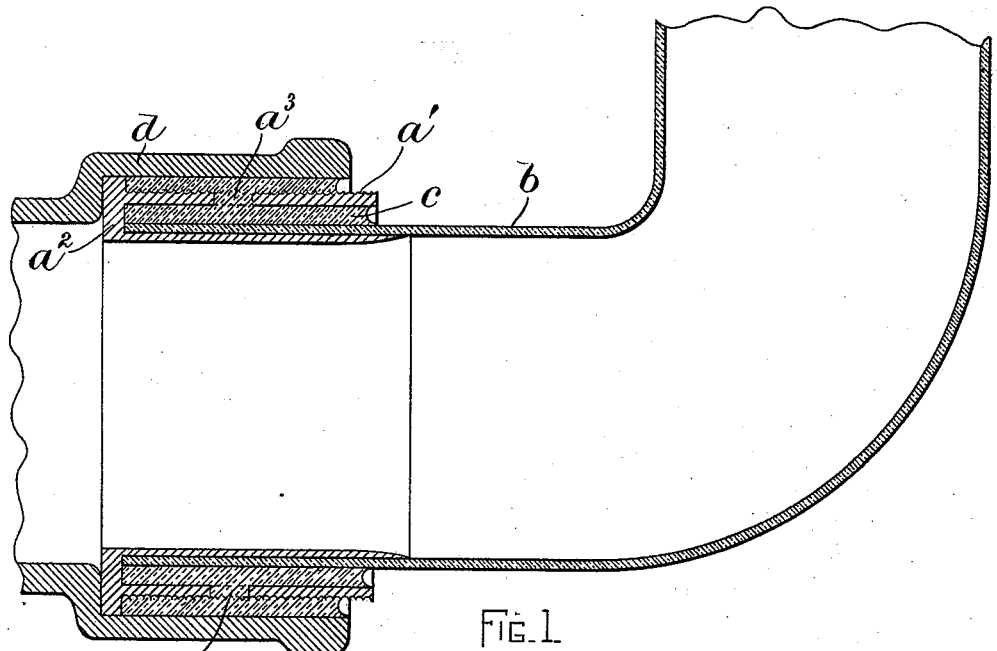
Figure 2:
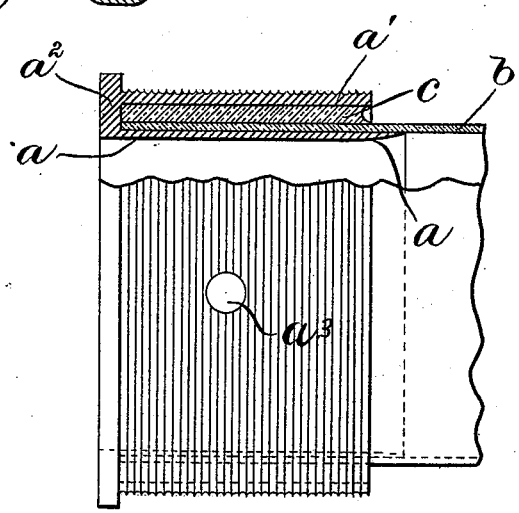

Of the accompanying drawings, forming part of this specification, Figure 1 represents a sectional view showing a lead bend secured to a cast-iron pipe by means of my improved coupling device. Fig. 2 represents a partial side elevation and partial section, showing the coupling device attached to the lead bend and removed from the cast-iron socket.

The same letters of reference indicate the same parts in both figures.

In the drawings, $d$ represents a bell mouth or socket formed on a cast metal pipe, and $b$ represents a length or section of lead pipe connected to said socket by my improved coupling device. As here shown, the lead pipe $b$ is of bent form and constitutes what is usually known as a lead bend; but it will be understood that my invention is intended for use in connection with any form of pipes which it is adapted to connect.

My improved coupling device is composed of an inner sleeve or collar $a$, adapted to be inserted in the interior of the lead pipe $b$ and to fit the latter closely, an outer sleeve or collar $a'$ separated from the inner sleeve by a uniform space of considerably greater width than the thickness of the pipe $b$, and a connecting head or flange $a^2$, which is integral with the sleeves $a$ and $a'$ and forms the bottom of the said annular space between the said sleeves. The outer periphery of the sleeve $a'$ is preferably corrugated or roughened, to engage the lead packing, as hereinafter described.

In using the improved coupling device, I insert the sleeve $a$ into the interior of the lead pipe $b$, and then insert the whole into the bell mouth or socket $d$. The head or flange $a^2$ projects outwardly beyond the outer periphery of the sleeve $a'$ far enough to insure the separation of the sleeve $a'$ from the inner surface of the bell mouth by an annular space, said flange $a^2$ being preferably formed to closely fit the interior of the bell mouth or socket $d$. It will be seen that when the parts are thus assembled, two annular spaces will be formed, one between the lead pipe $b$ and the inner surface of the sleeve $a'$, and the other between the outer surface of said sleeve and the inner surface of the bell mouth $a$, said spaces being closed at their inner ends by the head or flange $a^2$, and open at their outer ends, so that they may be simultaneously filled with the packing by pouring melted lead or other suitable packing material into the outer ends of said spaces. The outer sleeve $a'$ is preferably provided with orifices $a^3$, so that the melted lead packing will be interlocked with said sleeve by filling said orifices, as shown in Fig. 1.

It will be seen that the construction of the coupling, enabling two packings to be applied simultaneously, greatly facilitates the operation of connecting a lead pipe to a bell mouth or socket.

If desired, the inner lead packing $c$ may be applied to the space between the lead pipe and the inner surface of the sleeve $a'$ before the lead pipe and coupling are introduced into the bell mouth or socket $d$, as shown in Fig. 2.

I claim—

1. The improved coupling device comprising the inner sleeve $a$ formed to fit the inner surface of a length of pipe, the outer sleeve $a'$ separated from the inner sleeve by an annular space of greater width than the thickness of said pipe, and the connecting head or flange $a^2$ forming the bottom of the said space and projecting outwardly from the sleeve $a'$, as set forth.

2. The improved pipe coupling composed of the sleeves $a$ and $a'$ separated by an annular space, as described, the connecting head or flange $a^2$ projecting outwardly from the sleeve $a'$, said sleeve $a'$ being externally roughened or corrugated.

3. The improved pipe coupling composed of the sleeves $a$ and $a'$ separated by an annular space, as described, the connecting head or flange $a^2$ projecting outwardly from the sleeve $a'$, said sleeve $a'$ having orifices $a^3$, as set forth.

In testimony whereof I have signed my name to this specification, in the presence of two subscribing witnesses, this 24th day of February, A. D. 1894.

JAMES BARRETT.

Witnesses:
HORACE BROWN,
A. D. HARRISON.